US006230694B1

(12) United States Patent
Cook et al.

(10) Patent No.: US 6,230,694 B1
(45) Date of Patent: *May 15, 2001

(54) CALIBRATION AND TESTING OF AN AUTOMOTIVE EMISSION CONTROL MODULE

(75) Inventors: John E. Cook, Chatham (CA); Murray F. Busato, Clinton Twp., MI (US)

(73) Assignee: Siemens Canada, Ltd., Mississauga (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,184

(22) Filed: Nov. 25, 1998

Related U.S. Application Data

(60) Provisional application No. 60/086,680, filed on May 26, 1998.

(51) Int. Cl.[7] .......................... F02M 25/07; G01D 18/00

(52) U.S. Cl. .............................. 123/568.11; 123/568.27; 73/1.06; 73/1.35; 73/1.57; 73/117.3

(58) Field of Search .......................... 123/568.11, 568.21, 123/568.26, 568.27, 568.29; 73/1.01, 1.02, 1.06, 1.16, 1.35, 1.57, 1.58, 117.3, 118.1; 701/108

(56) References Cited

U.S. PATENT DOCUMENTS

| | | | |
|---|---|---|---|
| 3,880,129 | 4/1975 | Hollis, Jr. | 123/568.29 |
| 4,142,493 * | 3/1979 | Schira et al. | 123/568.21 |
| 4,173,205 * | 11/1979 | Toelle | 123/568.27 |
| 4,195,605 | 4/1980 | Weathers et al. | 123/568.29 |
| 4,231,340 | 11/1980 | Nishimiya et al. | 123/568.27 |
| 4,256,076 * | 3/1981 | Bradshaw | 123/568.29 |
| 4,349,003 | 9/1982 | Masuda | 123/568.29 |
| 4,351,285 * | 9/1982 | Bradshaw | 123/568.29 |
| 4,364,368 | 12/1982 | Blanchette | 123/568.29 |
| 4,455,987 | 6/1984 | Südbeck | 123/568.27 |
| 4,469,079 | 9/1984 | Cook | 123/568.27 |
| 4,497,335 | 2/1985 | Masuda | 137/244 |
| 4,566,423 | 1/1986 | Kenny et al. | 123/568 |
| 4,694,812 | 9/1987 | Wendt | 123/568.27 |
| 5,188,086 | 2/1993 | Adkins et al. | 123/568.27 |
| 5,203,313 | 4/1993 | Rotarius | 123/568.27 |
| 5,241,940 | 9/1993 | Gates, Jr. | 123/568.27 |
| 5,448,981 | 8/1994 | Cook et al. | 123/520 |
| 5,494,255 | 2/1996 | Pearson et al. | 251/129.15 |
| 5,613,479 | 3/1997 | Gates et al. | 123/568.27 |
| 5,669,364 | 9/1997 | Everingham | 123/568.18 |
| 5,901,690 * | 5/1999 | Hussey et al. | 123/568.26 |
| 5,960,776 | 10/1999 | Everingham et al. | 123/568.26 |

FOREIGN PATENT DOCUMENTS

| | | |
|---|---|---|
| 195 00 565 A1 | 11/1995 | (DE) . |
| 496 487 A1 | 1/1992 | (EP) . |
| 840 001 A2 | 10/1997 | (EP) . |

* cited by examiner

*Primary Examiner*—Willis R. Wolfe

(57) ABSTRACT

An automotive emission control module has an emission control valve containing a main flow passage having a valve member that controls fluid flow through the flow passage. An internal pressure sensing passage communicates pressure at one side of an orifice in the main flow passage to a pressure sensor. The pressure sensor and a fluid pressure regulator valve are integrated with the body of a fluid-pressure-operated actuator that operates the valve member. The module is calibrated and tested in a test stand, and can be re-calibrated after installation in an automotive vehicle.

15 Claims, 8 Drawing Sheets

CALIBRATION AND TESTING OF AN AUTOMOTIVE EMISSION CONTROL MODULE

REFERENCE TO RELATED APPLICATION AND PRIORITY CLAIM

This application expressly claims the benefit of earlier filing date and right of priority from the following patent application: U.S. Provisional Application Ser. No. 60/086,680, filed on May 26, 1998 in the names of John E. Cook and Murray F. Busato and entitled "Integrated Exhaust Gas Recirculation System". The entirety of that earlier-filed, co-pending patent application is hereby expressly incorporated herein by reference.

FIELD OF THE INVENTION

This invention relates generally to the testing and calibration of automotive emission control valves. More specifically it relates to the testing and calibration of an exhaust gas recirculation (EGR) module that is useful in an exhaust emission control system of an automotive vehicle powered by an internal combustion engine.

BACKGROUND OF THE INVENTION

U.S. Pat. Nos. 5,241,940 (Gates, Jr.) and 5,613,479 (Gates et al.), which are hereby incorporated by reference, disclose EGR systems of the type in which a module that can be tested and calibrated according to principles of the present invention is useful. Such a module possesses a construction that provides important economic and functional advantages relating to fabrication, assembly, testing, installation, and use, and certain principles of the present invention relate to the testing and calibration of such a module.

SUMMARY OF THE INVENTION

One generic aspect of the invention relates to a method of calibrating and testing an automotive emission control that comprises an emission control valve, a fluid-operated actuator, an electric-operated fluid regulator valve, and an electric sensor, the emission control valve comprising a body containing an internal main flow passage and a valve member for controlling flow through the flow passage. The fluid-operated actuator has an operative connection for operating the valve member, the electric sensor has a sensing port for sensing a characteristic of the flow and provides an electric signal correlated with the characteristic of the flow sensed at the sensing port, and the electric-operated fluid regulator valve supplies regulated fluid for operating the actuator. The method comprises associating the emission control valve, the actuator, the regulator valve, and the sensor with a test stand that comprises a fluid pump, a fluid flowmeter, and electric circuitry; calibrating the control by operating the pump and the regulator valve, including applying a defined electric signal from the electric circuitry of the test stand as a control signal input to the electric-operated fluid regulator valve, to create fluid flow through the flow passage of the emission control valve, and by measuring fluid flow through the flow passage with the flowmeter; supplying the electric signal from the sensor as a signal input to the electric circuitry of the test stand; adjusting one of the regulator valve and the actuator to secure a desired correlation of fluid flow measured by the flowmeter to the defined signal applied to the regulator valve; and testing the sensor by creating a defined fluid flow through the flow passage, and evaluating, by the electric circuitry of the test stand, the electric signal input from the sensor that occurs at the defined fluid flow.

More specific aspects include the adjusting step comprising adjusting the regulator valve; the step of operating the pump comprising applying vacuum to a port of the emission control valve body that is downstream of the valve member in the main flow passage while a port of the emission control valve body that is upstream of the valve member in the main flow passage is communicated to atmospheric pressure; the step of testing the sensor by producing a defined fluid flow through the flow passage of the emission control valve body comprises measuring the fluid flow with the flowmeter to secure correspondence of the measured fluid flow with the desired fluid flow; the further step of calibrating the sensor to cause the signal from the sensor to correspond to the defined fluid flow measured by the flowmeter; the step of calibrating the sensor comprising electrically programming calibration data into memory of the sensor via an electric terminal of the sensor; and the associating step including the step of communicating the sensing port of the sensor to the main flow passage of the emission control valve body to sense pressure in the main flow passage.

A further generic aspect relates to a method of calibrating an automotive emission control that comprises an emission control valve, an actuator, and an electric sensor, the valve comprising a body containing an internal main flow passage and a valve member for controlling flow through the flow passage, the actuator having an operative connection for operating the valve member, and the electric sensor having a sensing port for sensing a characteristic of flow through the main flow passage. The method comprises associating the emission control valve, the actuator, and the sensor with a test stand that comprises a fluid pump, a fluid flowmeter, and electric circuitry. The pump is operated to create defined fluid flow through the main flow passage of the valve body as measured by the flowmeter of the test stand, and the sensor is calibrated to cause an electric signal from the sensor to correspond to the defined fluid flow measured by the flowmeter. A more specific aspect comprises calibrating the sensor by electrically programming calibration data into memory of the sensor via an electric terminal of the sensor.

Still another generic aspect relates to a method of re-calibrating an engine emission control that is installed in an automotive vehicle and that comprises an engine emission control valve, an actuator, and an electric sensor, the valve comprising a body containing an internal main flow passage having an inlet port, an outlet port, and a valve member for selectively restricting flow through the flow passage between the inlet and outlet ports, the actuator having an operative connection for operating the valve member, the electric sensor having a sensing port for sensing a characteristic of the flow and providing an electric signal correlated with the characteristic of the flow, the inlet port being communicated to an exhaust system of an internal combustion engine that powers the vehicle, and the outlet port being communicated to vacuum derived from an intake system of the engine so that when the engine operates and the emission control valve is open, engine exhaust gas forms fluid flow through the flow passage in a direction from the inlet port to the outlet port. The method comprises: operating the engine to apply vacuum to the outlet port and to supply exhaust gas to the inlet port; operating the actuator to allow exhaust gas flow through the flow passage; sensing a characteristic of the engine exhaust gas; and re-calibrating the sensor to secure a desired relationship between the sensed characteristic of the exhaust gas and the fluid condition sensed by the sensor.

Further specific aspects relate to: the step of re-calibrating the sensor comprising electrically programming calibration data into memory of the sensor via an electric terminal of the sensor; the step of sensing a characteristic of the exhaust gas comprising sensing a signal from a sensor in the engine exhaust system, which can be an oxygen sensor; the step of re-calibrating the sensor comprising sensing at least one additional characteristic related to operation of the engine, which can be engine intake system vacuum and/or engine operating temperature.

BRIEF DESCRIPTION OF THE DRAWINGS

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
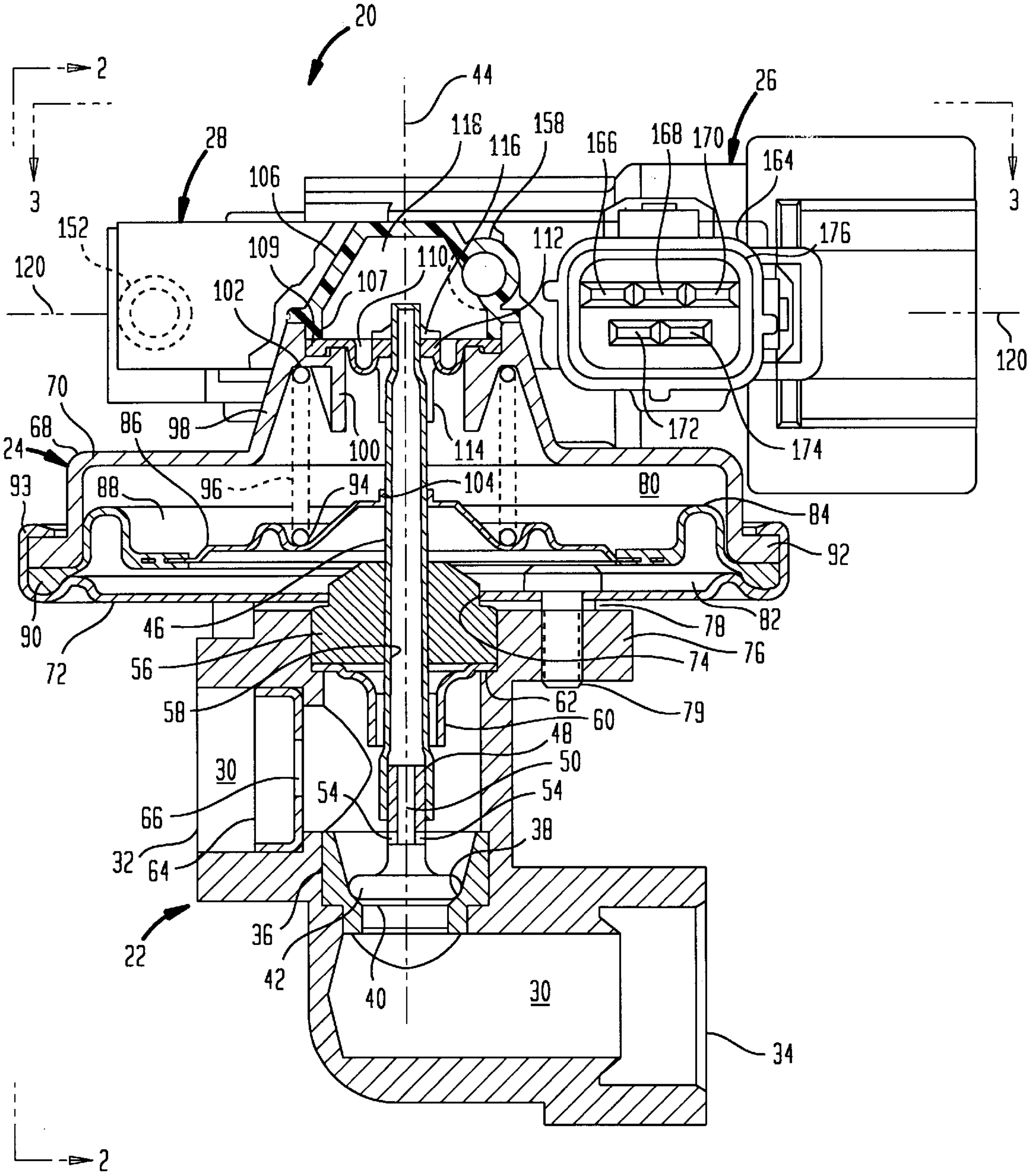
FIG. 1 is a front elevation view, partly in cross section, of an exemplary module that can be tested and calibrated according to principles of the present invention.
Figure 2:
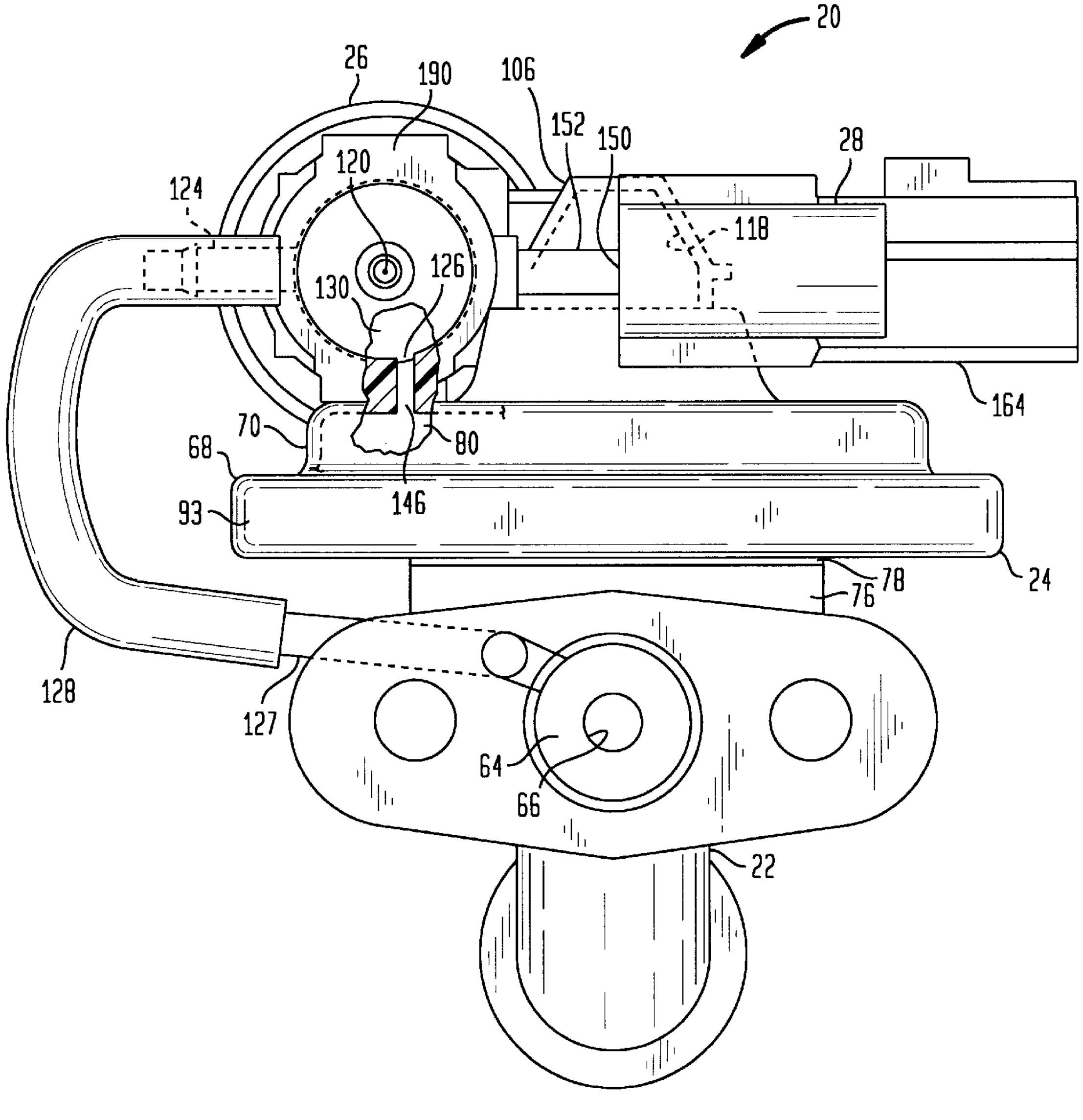
FIG. 2 is a full left side view in the direction of arrows 2—2 in FIG. 1.
Figure 3:
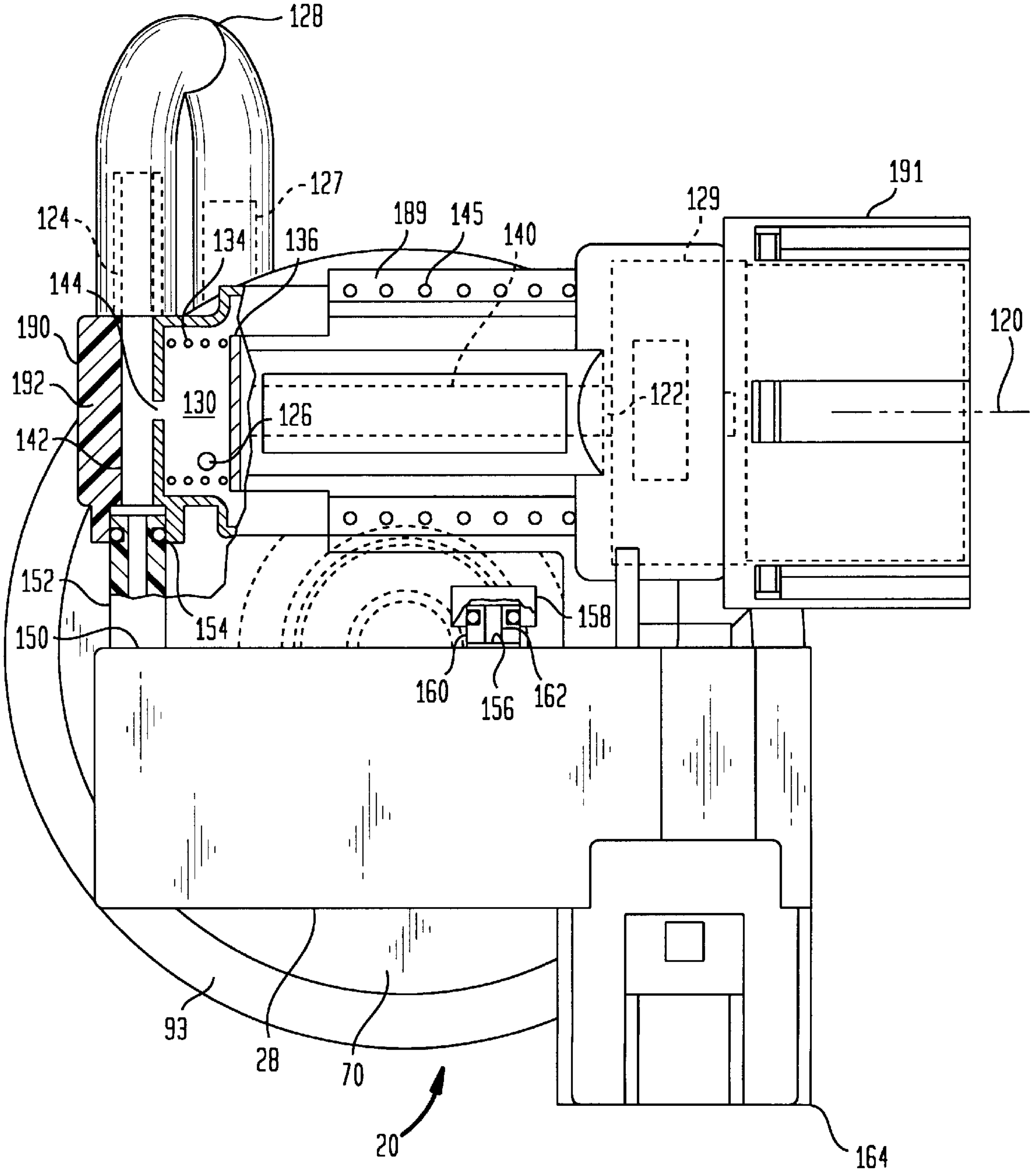
FIG. 3 is a full top plan view in the direction of arrows 3—3 in FIG. 1.

FIGS. 1–3 disclose a module 20 that can be tested and calibrated in accordance with principles of the present invention. Module 20 comprises an emission control valve body 22, a fluid-pressure-operated actuator 24, an electric-operated pressure regulator valve 26, and a sensor 28. Because incorporation of module 20 in EGR systems as described in the aforementioned "Gates" patents involves the use of engine induction system vacuum, i.e. negative pressure, valve 26 is an electric-operated vacuum regulator valve, sometimes referred to as an EVR valve, and sensor 28 is a pressure sensor that provides an electric signal related to the magnitude of sensed vacuum.

Valve body 22 comprises an internal main flow passage 30 extending between a first port 32 and a second port 34. An annular valve seat element 36 is disposed in valve body 22 to provide an annular seat surface 38 circumscribing a transverse cross-sectional area of passage 30. A valve member 40 comprising a non-flow-through valve head 42 is disposed within body 22 coaxial with an imaginary axis 44. Valve head 42 is shown seated on seat surface 38 closing passage 30 to flow between ports 32 and 34.

A hollow tube 46 is disposed coaxial with axis 44. One end of tube 46 is diametrically enlarged to telescopically overlap and join with a stem 48 of valve member 40 so that tube 46 functions as a shaft for operating valve member 40. Stem 48 comprises a central axial blind hole 50 and several radial holes 54 intersecting hole 50 to provide for the interior of tube 46 to communicate with passage 30. A bushing 56 is fitted to valve body 22 and comprises a central through-hole 58 providing axial guidance for motion of tube 46 along axis 44. Bushing 56 also captures the outer margin of a circular flange of a generally cylindrical walled metal shield 60 on an internal shoulder 62 of valve body 22. Shield 60 surrounds a portion of tube 46 that protrudes from through-hole 58. An orifice member 64 comprising an orifice 66 is wedged within passage 30 between port 32 and seat element 36 such that flow through main passage 30 is constrained to pass through orifice 66.

Fluid-pressure-operated actuator 24 comprises a body 68 that is in assembly with valve body 22 coaxial with axis 44. Actuator body 68 comprises a first body part 70 and a second body part 72. Body part 72 comprises sheet metal formed to a generally circular shape having a central through-hole 74 that allows the part to fit over an end of bushing 56 that protrudes beyond a flange 76 of body 22. An annular gasket 78 is sandwiched between body part 72 and flange 76. Each of body part 72, gasket 78, and flange 76 contains a like hole pattern that provides for the secure attachment of body part 72 to valve body 22 by headed screws 79 whose threaded shanks are passed through aligned holes in part 72 and gasket 78 and tightened in threaded holes in flange 76.

Body 68 comprises an interior that is divided into two chamber spaces 80, 82 by a movable actuator wall 84. Movable actuator wall 84 comprises an inner formed metal part 86 and an outer flexible part 88. Part 88 has a circular annular shape including a convolution that rolls as wall 84 moves. Part 88 also has a bead 90 extending continuously around its outer margin. The outer margin of actuator body part 70 comprises a shoulder 92, and bead 90 is held compressed between parts 70 and 72 by an outer margin 93 of body part 72 being folded around and crimped against shoulder 92, thereby securing parts 70, 72, and 88 in assembly and sealing the outer perimeters of chamber spaces 80 and 82. The inner margin of part 88 is insert-molded onto the outer margin of part 86 to create a fluid-tight joint uniting the two parts.

Part 86 is constructed to provide a seat 94 for seating an axial end of a helical coil compression spring 96 that is disposed within chamber space 80. Body part 70 comprises a central tower 98 proximate the end of which is an integral circular wall 100 that provides an internal circular groove 102 for seating the opposite end of spring 96. In this way spring 96 acts to bias movable wall 84 axially toward valve seat surface 38. Part 86 further comprises a central flanged hole 104 through which tube 46 passes and to which tube 46 has fluid-tight attachment. Accordingly, the biasing of wall 84 by spring 96 acts via tube 46 to urge valve head 42 toward seating on seat surface 38, and thereby closing passage 30 to flow between ports 32 and 34. Part 88 comprises a convolution that rolls as wall 84 moves within body 68.

The actuator body further includes a cap 106 that is mounted atop tower 98 to close the otherwise open end of part 70. Cap 106 is in assembly with part 70 and comprises a rim 107 that forces a sealing bead 109 of a movable separator wall 110 against wall 100. Wall 110 is a flexible part having bead 109 extending around its outer margin, a bead 112 around its inner margin, and a rolling convolution between its inner and outer margins. Bead 112 is held fluid-tight on tube 46 between a sleeve 114 that is fitted onto tube 46 below bead 112 and a washer 116 that is fitted onto tube 46 above the bead. Cap 106 and wall 110 thereby cooperatively define a third chamber space 118 that is consecutive along axis 44 to chamber spaces 80 and 82 and separated from chamber space 80 by wall 110. The end of tube 46 disposed within chamber space 118 is open, thereby placing the interior of the former in communication with the latter. Because the convolution of separator wall 110 rolls as the central region of the wall is moved by tube 46, the volume of chamber space 118 varies with the movement imparted to tube 46 by actuator 24.

EVR valve 26 has an imaginary longitudinal axis 120 that is disposed orthogonal to a plane containing axis 44. Valve 26 comprises an atmospheric inlet port 122 for communication to atmosphere, a source vacuum inlet port 124 for communication to engine intake system vacuum, and a regulated vacuum outlet port 126. Because port 30 is communicated to intake system vacuum when module 20 is in use, that vacuum can be conveniently communicated to port 124 by a tap 127 into body 22 immediately adjacent port 30 before orifice 66 and a C-shaped hose 128 having one end fitted over an exterior end of tap 127 and another end fitted over a nipple that forms source vacuum inlet port 124 in the illustrated embodiment.

EVR valve 26 comprises an enclosure, or body, 190 having a cylindrical side wall 189 and containing an internal regulating mechanism like that of the EVR valves described in U.S. Pat. No. 5,448,981, which is incorporated herein by reference. Atmospheric inlet port 122 communicates to atmosphere through a particulate filter 129 contained within an interior space at one axial end of enclosure 190. Enclosure 190 comprises an end cap 191 fitted over filter 129 at that one axial end. Within an opposite axial end of the enclosure is a regulated vacuum chamber space 130. A helical coil compression spring 134 is disposed within chamber space 130 to bias a valve disk 136 toward seating on a valve seat 138 at an end of a passage 140 that is coaxial with axis 120 and leads to atmospheric port 122. When seated, valve disk 136 closes passage 140, blocking communication between chamber space 130 and atmosphere.

Proximately adjacent chamber space 130, an end wall 192 of enclosure 190 contains a passageway 142 that is transverse to axis 120 and forms a continuation of the passage through the nipple forming port 124. Communication between chamber space 130 and passageway 142 is through an orifice 144 that is integrally formed in end wall 190 coaxial with axis 120.

The internal mechanism of EVR valve 26 further comprises a solenoid 145 that is operated by pulse width modulation. The pulse width modulation of solenoid 145 modulates disk 136 to correspondingly modulate the bleeding of vacuum from chamber space 130 through passage 140 to atmosphere. A pulse width modulated electric signal applied to solenoid 145 causes the vacuum in chamber space 130 to be regulated in accordance with the degree of signal modulation within a range that extends essentially from full intake system vacuum applied at vacuum inlet port 124 to essentially atmospheric pressure applied at atmospheric inlet port 122.

Side wall 189 and end wall 192 of enclosure 190, and actuator body part 70 are embodied in a single polymeric part which includes an internal passage 146 extending from regulated vacuum outlet port 126 to actuator chamber space 80 to place the latter in fluid communication with chamber space 130. In this way, the vacuum in chamber space 80 is regulated in accordance with the pulse-width-modulated electric signal that operates valve 26.

Passageway 142 also serves to pass intake system vacuum to a pressure sensing port 150 of sensor 28. This is accomplished through a tube 152 extending between port 150 and a location on EVR valve 26 diametrically opposite the nipple forming port 124. Tube 152 may be embodied as part of the body of sensor 28, fitting into a counterbore in EVR valve 26 at the end of passage 172. The end portion of tube 152 comprises an O-ring 154 seated in an external circular groove to provide a fluid-tight radial seal of the tube's O.D. to the I.D. of the counterbore.

Sensor 28 comprises a second pressure sensing port 156 that is communicated to chamber space 118. A frustoconical shaped wall of cap 106 contains a local formation 158 that provides a tap to chamber space 118. A tube 160, which like tube 152 may be embodied as a part of the pressure sensor body, is disposed to extend from the sensor body parallel to tube 152 for communicating port 156 with the tap into chamber space 118. The end portion of tube 160 comprises an O-ring 162 seated in an external circular groove to provide a fluid-tight radial seal of the tube's O.D. to the I.D. of a hole that extends through the wall of formation 158.

The organization and arrangement that has been described therefore provides first and second pressure sensing passages. The first pressure sensing passage extends from port 32 through tap 127, hose 128, passageway 142, and tube 152 to sensing port 150. The second pressure sensing passage extends from main flow passage 30 at a location between orifice 66 and valve seat 38, through stem 48 of valve member 40, through tube 46, through chamber space 118, through formation 158, and through tube 160 to sensing port 156. In this way sensor 28 can sense pressure differential across orifice 66.

An electric connector 164 provides for sensor 28 and EVR valve 26 to be connected with an electric control circuit (not shown). Connector 164 contains five one-piece, stamped metal, terminals, three of which, 166, 168, 170, are associated with sensor 28 and two of which, 172, 174, with EVR valve 26. Connector 164 comprises a surround 176 that forms part of the body of sensor 28. Surround 176 laterally bounds free ends of all five terminals 166, 168, 170, 172, 174. Terminals 166, 168, 170 extend into the sensor body from their free ends that are within surround 176 to connect to respective sensor element leads. Terminals 172, 174 extend through the sensor body from the free ends that are within surround 176 to opposite free ends arranged in a fixed terminal end pattern. There they make mating connection with similarly arranged terminal ends of terminals of EVR valve 26 upon assembly of sensor 28 and valve 26 together. Such assembly comprises aligning tube 152 with hole 154, aligning tube 160 with hole 162, and aligning terminals of EVR valve 26 with corresponding terminals carried by sensor 28, and then advancing the sensor and EVR valve toward each other.

Figure 4:
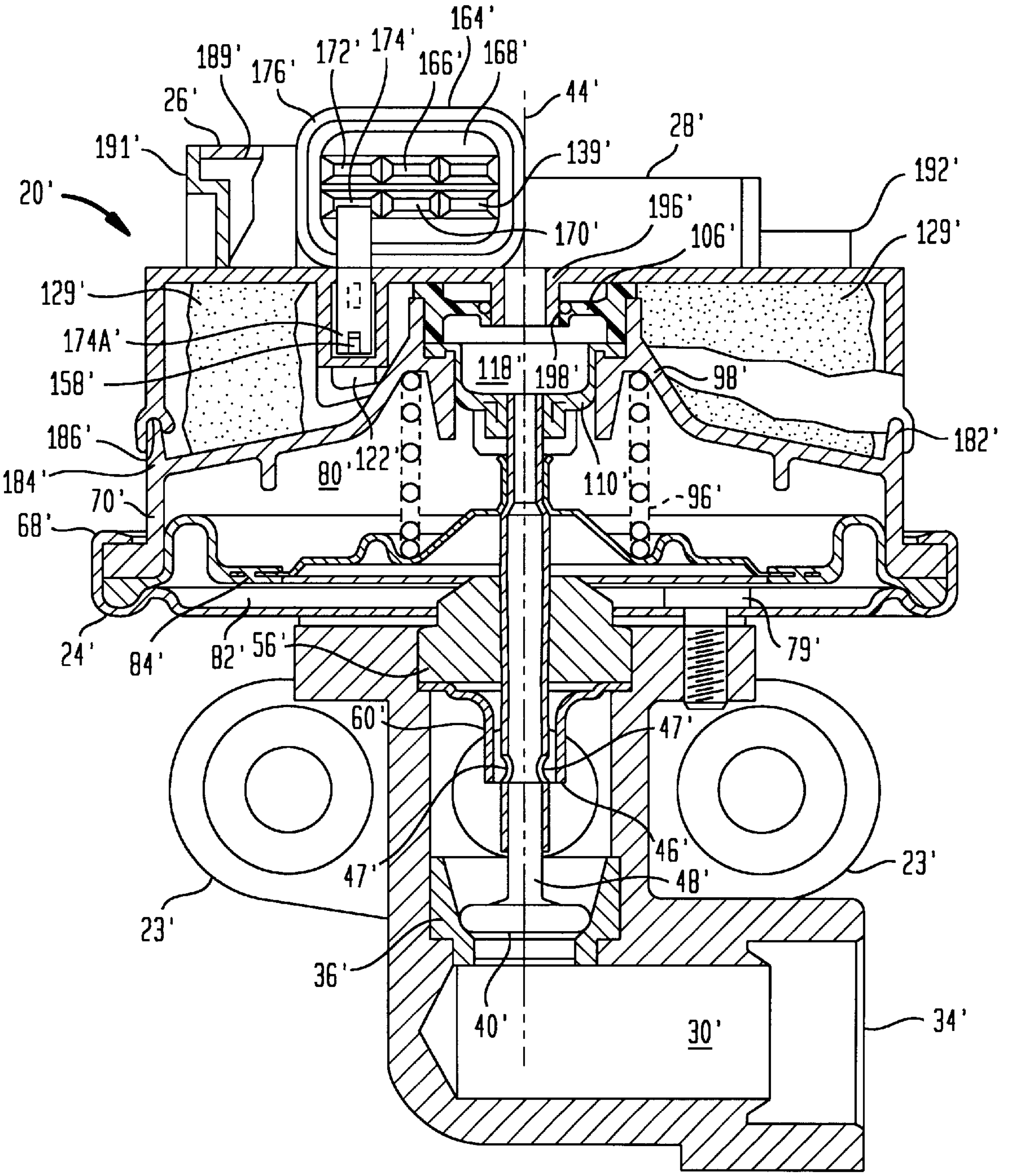
FIG. 4 is view similar to FIG. 1 showing a second exemplary module.
Figure 6:
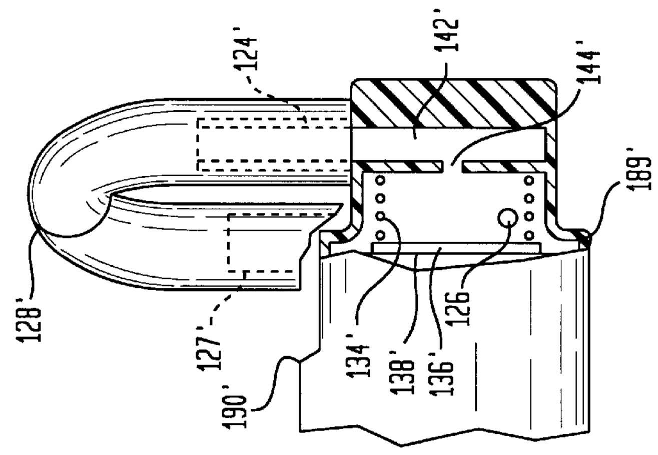
FIG. 6 is a fragmentary view looking in the general direction of arrow 6 in FIG. 5 with portions sectioned away.
Figure 5:
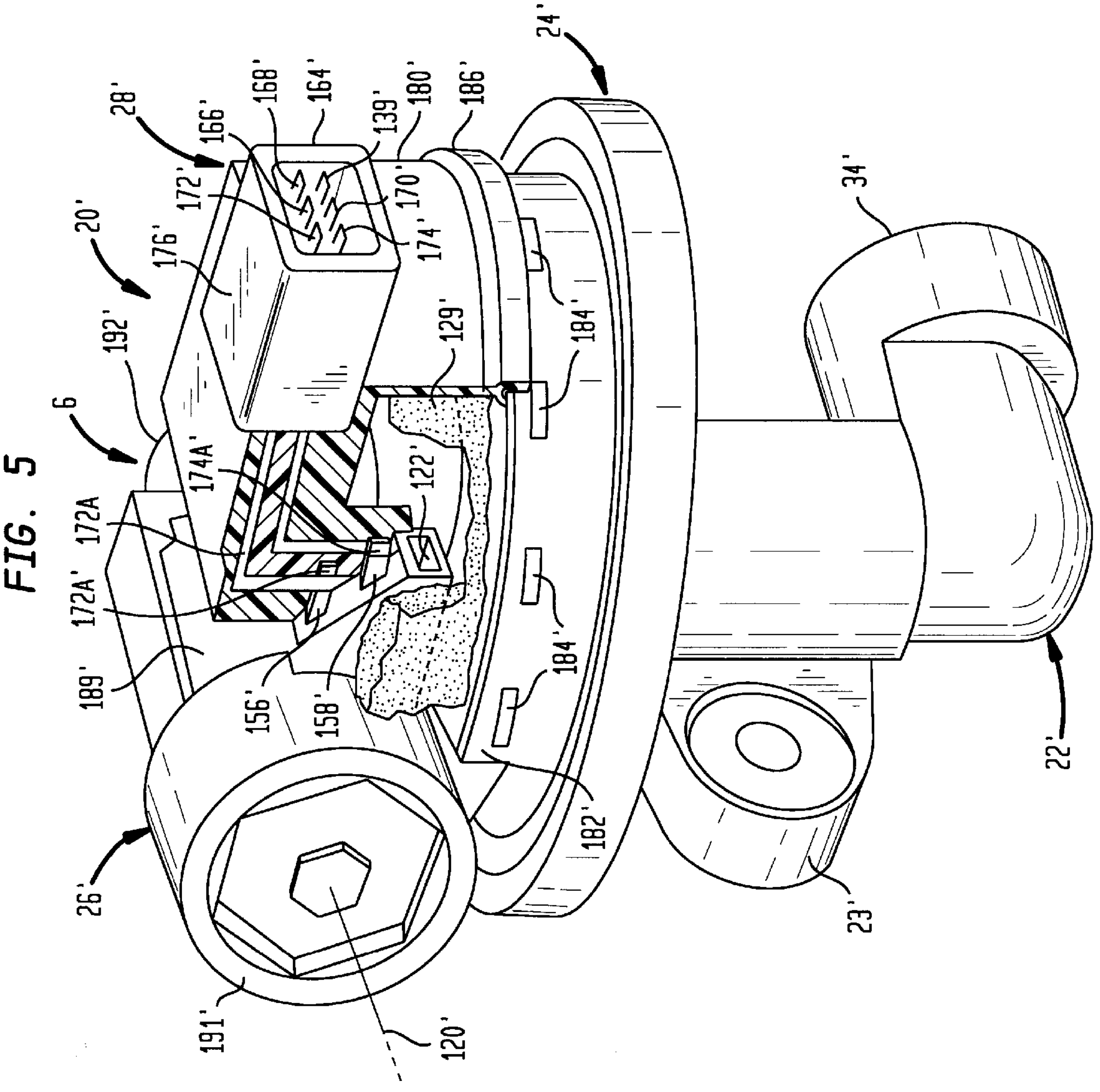
FIG. 5 is a perspective view, partly broken away, of the FIG. 4 embodiment.

FIGS. 4, 5, and 6 show an embodiment of valve 20' in which component parts corresponding to parts of valve 20 already described are identified by like reference numerals. While the general organization and arrangement of valve 20' is like that of valve 20, several prime-numbered parts, including the following, differ in certain details from their unprime-numbered counterparts: actuator body part 70'; EVR valve 26'; pressure sensor 28'; electric connector 164';

cap 106'; valve member 40'; tube 46'; movable actuator wall 84'; and movable separator wall 110', for examples.

EVR valve 26' has its atmospheric inlet port 122' open to a somewhat semi-circularly shaped space that is enclosed by filter 129' and by the mounting of sensor 28' on actuator 24'. Filter 129' is also enclosed by the mounting of sensor 28' and has a somewhat semi-circular shape that surrounds the open space to which atmospheric inlet port 122' is communicated. The body of sensor 28' includes a somewhat semi-circular shaped skirt 180' that provides a downright side wall spaced slightly outward of a somewhat semi-circular outer surface of filter 129'. Actuator body part 70' has an upright rim 182' that contains a series of through-holes 184'. Air can enter via these through-holes to the space between the inside wall surface of skirt 180' and the radially outer surface of filter 129'. In this way, the semi-circular circumferential extent of filter 129' about axis 44' provides an ample surface area for filtration of air without significant restriction before the air can enter port 122'. The filter is preferably constructed to minimize pressure drop across it and to distribute the airstream passing through it as uniformly as possible so as to avoid the creation of "hot spots".

The lower edge of skirt 180' has a groove 186' that fits onto the upper edge of rim 182' when the skirt and rim are in assembly relationship. From the base of tower 98', the wall of part 70' declines toward through-holes 184' to provide a declined surface for gravity drainage of any liquid that may accumulate within space enclosed by the mounting of sensor 28' on actuator 24'. Filter 129' and skirt 180' have a circumferential co-extent that is circular for less than 360° about axis 44'. Beyond this approximately semi-circular co-extent, both the filter and the body of sensor 28' are shaped to fit to external surfaces of actuator body part 70' and/or EVR valve enclosure 190' in fluid-tight manner that may include a suitable seal. For example, from generally diametrically opposite ends of its semi-circular extent, the skirt may continue more or less chordally relative to axis 44' so as to lie in a plane generally parallel to axis 120' and for the most part close against actuator body part 70' except for a notch that fits onto a projecting portion of the EVR enclosure that projects away from axis 120' and contains electric terminals 156' and 158' and port 122'.

The body of sensor 28' houses pressure sensing elements that supply electric signals related to pressures sensed at its ports; it also integrates electric connector 164'. Four terminals 166', 168', 170', and 139' of connector 164' extend within the sensor body from a surround 176' to make electric connections with respective leads of sensor elements of sensor 28'. Two terminals 172', 174' of connector 164' have right-angle shapes and extend within the sensor body from surround 176' to terminate in forked ends 172A', 174A' that make connection to respective blade terminals 156', 158' that are part of EVR valve 26'. Hence, electric connections for both EVR valve 26' and pressure sensor 28' are embodied in a single connector 164'.

Like actuator body part 70 and wall portions 189, 192 of enclosure 190, actuator body part 70' and wall portions 189', 192' of EVR valve 26' are embodied in a single part of homogeneous material throughout, such as a polymeric (plastic) part fabricated by injection molding. Internal mechanism of valve 26' is assembled into enclosure 190' through an opening at the opposite axial end of side wall 189' which is thereafter closed by an end cap 191'. The single polymeric part that integrates enclosure 190' and actuator body part 70' also contains an internal passage 146' that communicates regulated vacuum port 126' of EVR valve 26' to chamber space 80' of actuator 24'. Intake system vacuum is communicated through tap 127' and hose 128' to a vacuum inlet port 124' in end wall 192' centered on axis 120'. Within enclosure 190' just inside end wall 192' is an arrangement that is analogous to that described for module 20. That arrangement is shown in FIG. 6.

Stem 48' contains no portion of the sensing passage that extends through the interior of tube 46'. Just beyond the end of stem 48' the side wall of tube 46' has several through-holes 47' that communicate the interior of the tube to main passage 30'. Shield 60' axially overlaps these through-holes for all operating positions of tube 46'.

Figure 7:
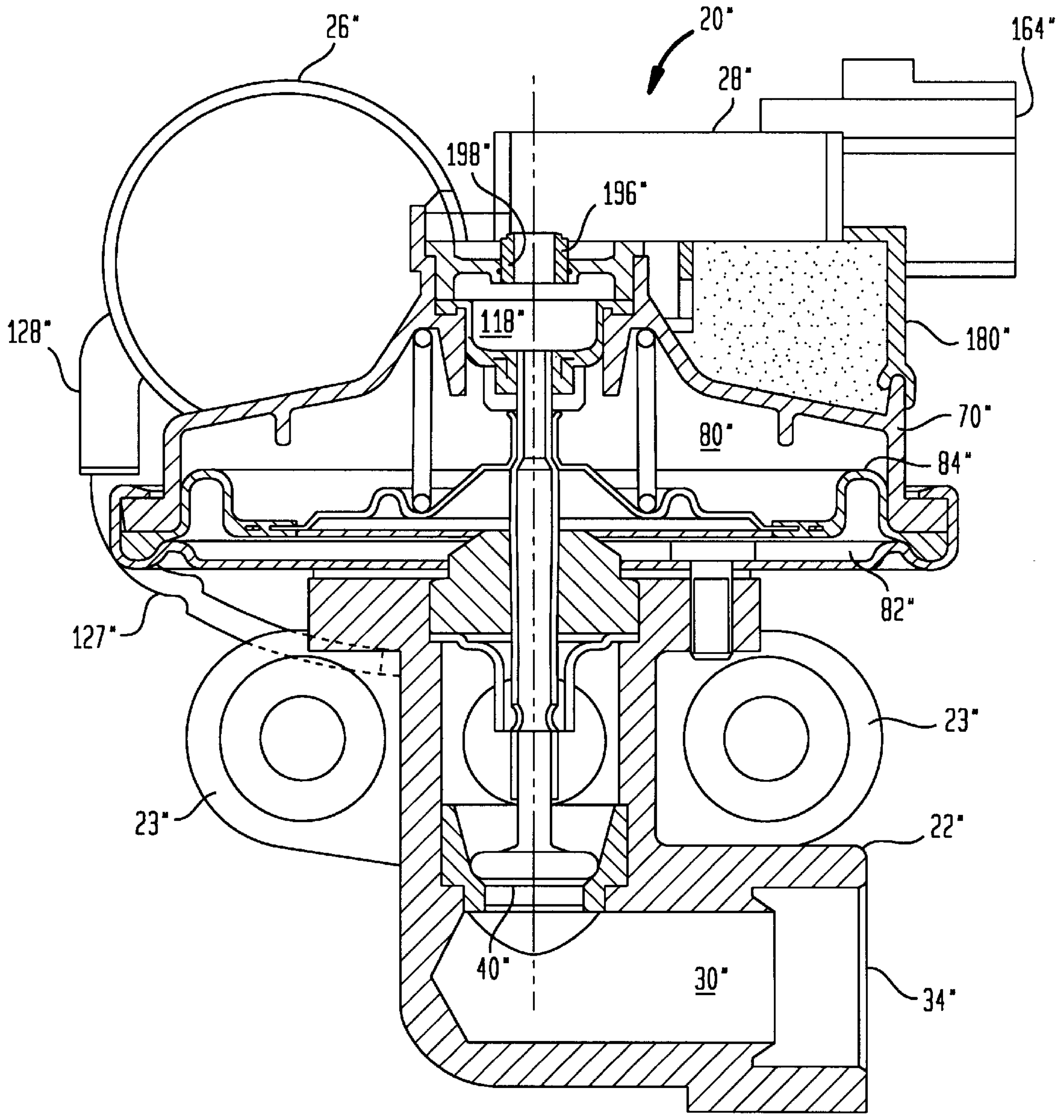
FIG. 7 is a view similar to FIG. 1 showing a third exemplary module.

FIG. 7 discloses an embodiment of module 20" in which component parts corresponding to parts of module 20' are identified by like reference numerals, except double primed. The general organization and arrangement of module 20" is like that of module 20', except that actuator 24" and those parts mounted on actuator body part 70" are disposed 90° about axis 44" from the disposition in module 20', and the tap for supplying intake system vacuum to port 32" has been relocated.

In use of any of EGR modules 20, 20', and 20", port 34, 34', 34" is communicated to engine exhaust gas and port 32, 32', 32" to engine intake system vacuum, such as intake manifold vacuum. For mounting of any of the valves, valve body 22, 22', 22" may include a respective mounting flange 23, 23', 23" that contains multiple holes for fastening the valve by means of fasteners.

Each of valves 20, 20', and 20" may function in the manner described in either of the above referenced U.S. Pat. Nos. 5,241,940 (Gates, Jr.) and 5,613,479 (Gates et al.). Briefly, control of exhaust gas flow through main passage 30, 30', 30" is accomplished by operating the EVR valve 26, 26', 26" to cause the pressure differential across movable actuator wall 84, 84', 84" to position valve head 40, 40', 40" to regulate the pressure differential across orifice 66, 66', 66" in a desired manner for particular engine operating conditions. Chamber space 82, 82', 82" is communicated to atmosphere, such as by one or more openings through the wall of part 72, 72', 72" adjacent flange 23, 23', 23". Because orifice 66, 66', 66" possesses an inherent pressure drop vs. flow characteristic, control of the pressure differential across it will inherently control flow through the EGR valve.

Various other inventive aspects relating to the disclosed modules may be found in the following commonly assigned, co-pending, non-provisional patent applications that are also incorporated in their entirety herein by reference: Ser. No. 09/199,182, INTERNAL SENSING PASSAGE IN AN EXHAUST GAS RECIRCULATION MODULE; Ser. No. 09/199,183, INTEGRATION OF SENSOR, ACTUATOR, AND REGULATOR VALVE IN AN EMISSION CONTROL MODULE; Ser. No. 09/199,185, METHOD OF MAKING AN AUTOMOTIVE EMISSION CONTROL MODULE HAVING FLUID-POWER-OPERATED ACTUATOR, FLUID PRESSURE REGULATOR VALVE, AND SENSOR; and Ser. No. 09/199,186, AUTOMOTIVE VEHICLE HAVING A NOVEL EXHAUST GAS RECIRCULATION MODULE.

Figure 8:
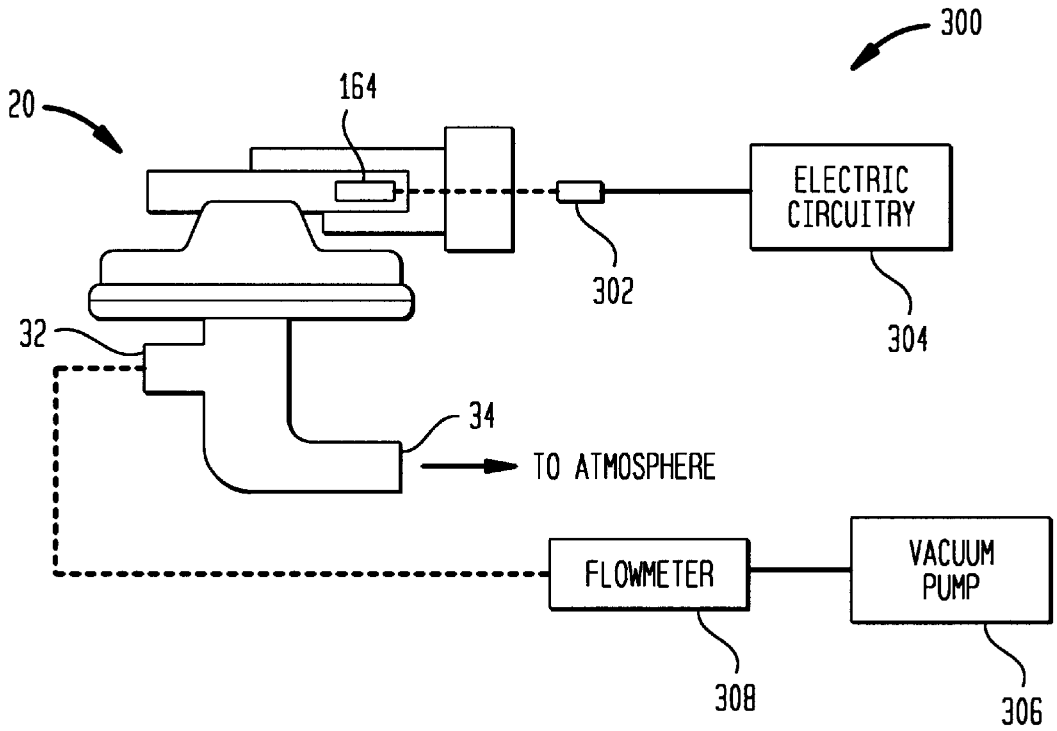
FIG. 8 is a schematic diagram of a module being tested and calibrated in a test stand in accordance with principles of the present invention.

FIG. 8 depicts an exemplary module 20 in association with a test stand 300. The test stand comprises a fixture for mounting module 20 such that test vacuum can be applied to port 32 while port 34 is left open to atmosphere, possibly through a particulate filter (not shown) placed over the port if undesired air-entrained particulates are present. An electric connector 302 from electric circuitry 304 of test stand 300 is mated with connector 164 to connect solenoid 145 and the sensing element(s) of sensor 28 with circuitry 304.

Test stand 300 further comprises a pump 306, electric-driven for example, for applying test vacuum to port 32 and a fluid flowmeter 308 for measuring fluid flow through module 20 resulting from the application of test vacuum.

Calibration of module 20 is performed by operating pump 306 to apply a defined test vacuum to port 32 and thereby induce fluid flow through main flow passage 30 and flowmeter 308. Also, a defined signal from electric circuitry 304 is applied to solenoid 145 to open valve member 30. Flowmeter 308 measures flow through main flow passage 30 corresponding to the defined signal being applied to solenoid 145. If the measurement is not within a certain tolerance band, then one of EVR valve 26 and actuator 24 is adjusted to secure a desired correlation of measured fluid flow to the defined signal.

EVR valve 26 can be adjusted in the following manner, described with reference to FIG. 3. The magnitude of regulated vacuum in chamber space 130 is a function of the force with which valve disk 136 seals against seat 138. That sealing force is itself a function of the spring force applied by spring 134 and the magnetic force applied by solenoid 145. As shown by the Figure, passage 140 extends through the central stator of solenoid 145, and valve disk 136 is, when seated on seat 138, spaced a certain axial distance from the end of the solenoid stator. The axial dimension of that air gap, which spaces the disk from the stator, defines the relationship between the electric signal applied to the solenoid coil and the regulated vacuum developed in chamber space 130. Increasing the axial dimension of the air gap decreases the magnitude of regulated vacuum developed for a given input signal, and hence decreases the vacuum in chamber space 80 to decrease the EGR flow; decreasing the gap increases the regulated vacuum, and hence increases the vacuum in chamber space 80 to increase the EGR flow. By providing a threaded mounting of the central stator in the EVR valve and a feature that allows a tool to engage and rotate the central stator, the axial dimension of the air gap can be set to achieve the desired adjustment. A suitable tool engagement surface can be provided on the right end of the central stator, as viewed in FIG. 3, and tool access can be provided by removal cap 191. Calibration of module 20 in test stand 300 by adjustment of EVR valve 26 is performed by applying a certain electric signal to the EVR solenoid coil and adjusting the air gap until a desired flow through main flow passage 30 is measured.

Sensor 28 is then tested by operating module 20 and test stand 300 to cause defined fluid flow through main flow passage 30, and evaluating, in electric circuitry 302 of test stand 300, the signal from sensor 28 that is given at the defined flow in comparison to a desired signal. If the measured signal is within a certain tolerance, the sensor is deemed accurate. If not, calibration is performed.

Sensor 28 may be a programmable type sensor which can be calibrated by electrically programming digital calibration data into memory of the sensor via an electric terminal, or terminals, of the sensor. Depending on the specific sensor employed, such programming may be performed via the same terminal(s) at which the sensor provides its signal output(s), or via a separate devoted terminal or terminals.

Figure 10:
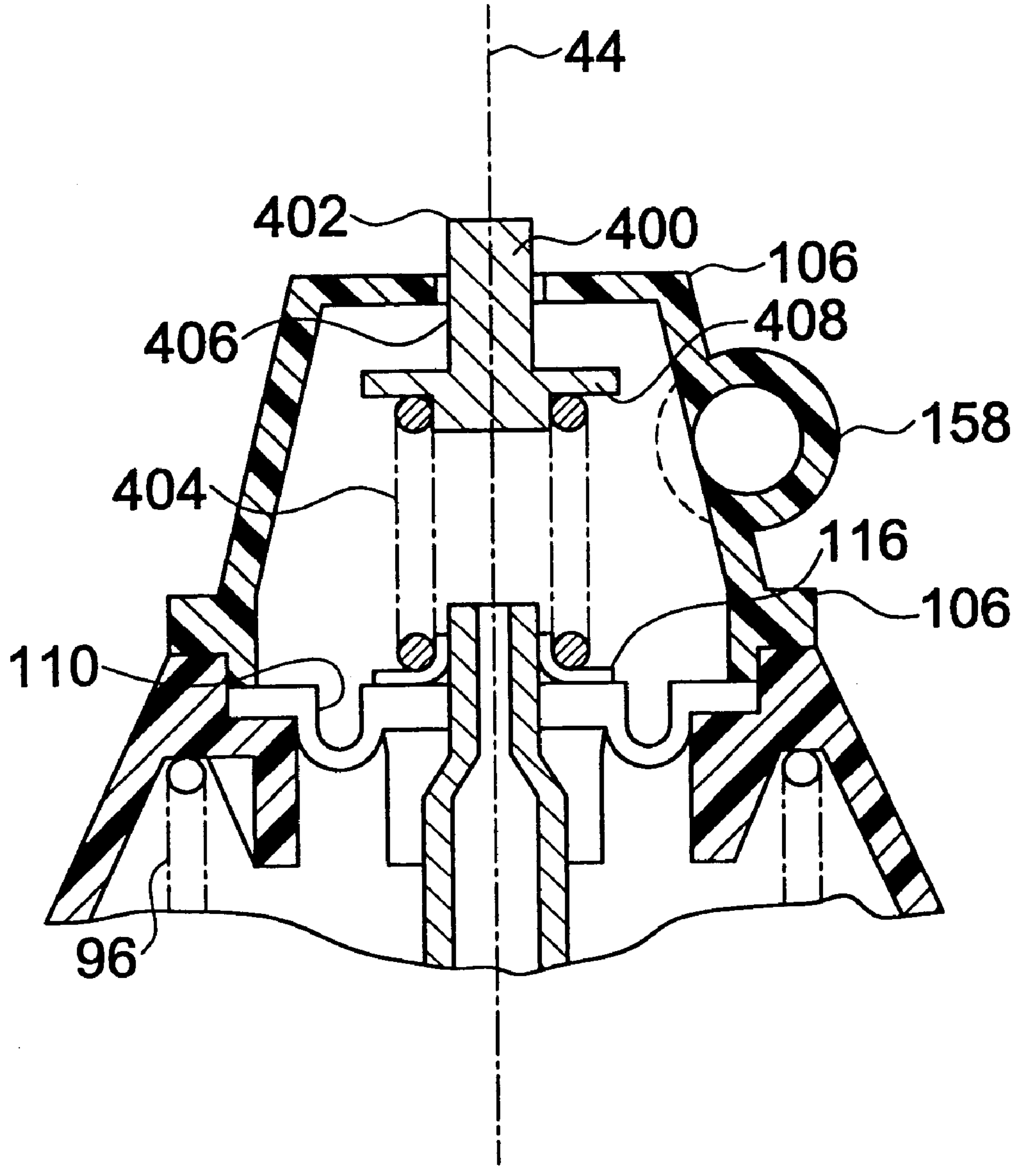
FIG. 10 is a fragmentary view in cross section of a modification to a portion of the module of FIG. 1.

Calibration may also be performed by adjustment of actuator 24. FIG. 10 shows a modified form of actuator that includes an adjustment feature. The top wall of cap 106 comprises a threaded hole 400 coaxial with axis 44. This modified form further includes an adjuster element 402 and a helical coil compression spring 404. Adjuster element 402 comprises a threaded shank 406 that is threaded with hole 400. One axial end of element 402 is external to cap 106 while an opposite axial end is internal and contains a spring seat 408 seating one axial end of spring 404. Spring 404 is disposed coaxial with axis 44, and the opposite axial end bears against washer 116.

Spring 404 is thereby held in compression, and its force combines with that of spring 96 toward biasing valve member 40 closed. By providing the external end of shank 406 with a tool engagement surface that can be engaged by a tool to rotate element 402 about axis 44, such rotation can vary the extent to which spring 404 is compressed, and hence the force acting to seat valve member 40 closed. By increasing the spring compression, the force required to unseat the valve member will increase; and by decreasing the compression, the required force will decrease. Adjustment of element 402 can be performed either in a fully, or a partially, fabricated module. Adjustment is performed by applying a certain vacuum to chamber space 80 and adjusting element 402 until a desired flow through main flow passage 30 is measured. The forces of the respective springs 404 and 96 are chosen to provide a suitable range of adjustment for the flows which a particular module must control.

Figure 9:
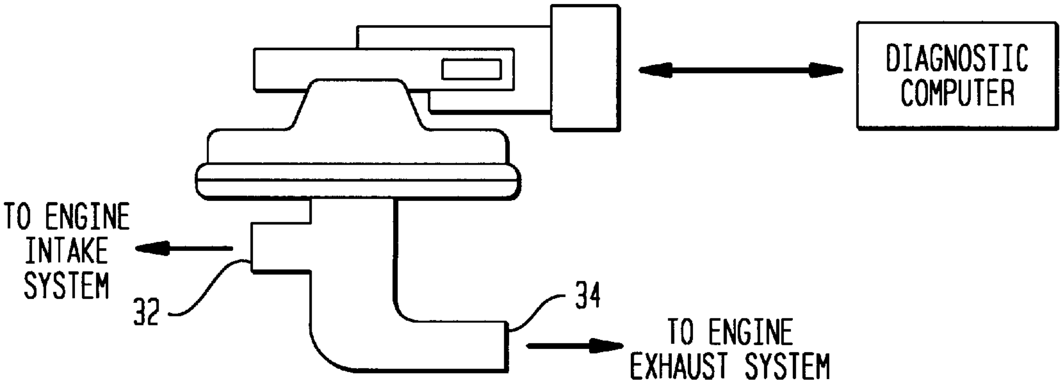
FIG. 9 is a schematic diagram of a module being re-calibrated in an automotive vehicle in accordance with principles of the present invention.

Certain inventive principles may also be applied to re-calibrating a sensor after the module has been installed in an automotive vehicle. FIG. 9 shows an installed module 20 having port 32 connected to receive intake system vacuum from an internal combustion engine that powers the vehicle. Port 34 is connected to receive exhaust gas from the engine. Sensor re-calibration is performed by connecting diagnostic apparatus, such as a diagnostic computer, to an available diagnostic connector in the vehicle, and operating the engine. The computer can operate valve member 40 and monitor the response of an oxygen sensor, or sensors, associated with the engine exhaust system. If the monitored response is not within a desired range, then an appropriate re-calibration of sensor 28 can be made, such as by re-programming the sensor in the manner explained above. The computer can calculate the appropriate re-programming based on whatever other data parameters (additional to oxygen sensor output) may be appropriate, intake system vacuum and engine operating temperature being examples of such parameters.

It is to be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. A method of calibrating and testing an automotive emission control that comprises an emission control valve, a fluid-operated actuator, an electric-operated fluid regulator valve, and an electric sensor, the emission control valve comprising a body containing an internal main flow passage and a valve member for controlling flow through the flow passage, the fluid-operated actuator having an operative connection for operating the valve member, the electric sensor having a sensing port for sensing a characteristic of the flow and providing an electric signal correlated with the characteristic of the flow sensed at the sensing port, and the electric-operated fluid regulator valve supplying regulated fluid for operating the actuator, the method comprising:

associating the emission control valve, the actuator, the regulator valve, and the sensor with a test stand that comprises a fluid pump, a fluid flowmeter, and electric circuitry;

calibrating the control by operating the pump and the regulator valve, including applying a defined electric signal from the electric circuitry of the test stand as a control signal input to the electric-operated fluid regulator valve, to create fluid flow through the flow passage of the emission control valve, and by measuring fluid flow through the flow passage with the flowmeter;

supplying the electric signal from the sensor as a signal input to the electric circuitry of the test stand;

adjusting one of the regulator valve and the actuator to secure a desired correlation of fluid flow measured by the flowmeter to the defined signal applied to the regulator valve; and testing the sensor by creating a defined fluid flow through the flow passage, and evaluating, by the electric circuitry of the test stand, the electric signal input from the sensor that occurs at the defined fluid flow.

2. A method as set forth in claim 1 in which the adjusting step comprises adjusting the regulator valve.

3. A method as set forth in claim 1 in which the step of operating the pump comprises applying vacuum to a port of the emission control valve body that is downstream of the valve member in the flow passage while a port of the emission control valve body that is upstream of the valve member in the flow passage is communicated to atmospheric pressure.

4. A method as set forth in claim 1 in which the step of testing the sensor by producing a defined fluid flow through the flow passage of the emission control valve body comprises measuring the fluid flow with the flowmeter to secure correspondence of the measured fluid flow with the desired fluid flow.

5. A method as set forth in claim 1 including the step of calibrating the sensor to cause the signal from the sensor to correspond to the defined fluid flow measured by the flowmeter.

6. A method as set forth in claim 5 in which the step of calibrating the sensor comprises electrically programming calibration data into memory of the sensor via an electric terminal of the sensor.

7. A method as set forth in claim 6 in which the associating step includes the step of communicating the sensing port of the sensor to the main flow passage of the emission control valve body to sense pressure in the main flow passage.

8. A method of calibrating an automotive emission control that comprises an emission control valve, an actuator, and an electric sensor, the valve comprising a body containing an internal main flow passage and a valve member for controlling flow through the flow passage, the actuator having an operative connection for operating the valve member, and the electric sensor having a sensing port for sensing a characteristic of flow through the main flow passage, the method comprising:

associating the emission control valve, the actuator, and the sensor with a test stand that comprises a fluid pump, a fluid flowmeter, and electric circuitry;

operating the pump to create defined fluid flow through the main flow passage of the valve body as measured by the flowmeter of the test stand; and calibrating the sensor to cause an electric signal from the sensor to correspond to the defined fluid flow measured by the flowmeter.

9. A method as set forth in claim 8 in which the step of calibrating the sensor comprises electrically programming calibration data into memory of the sensor via an electric terminal of the sensor.

10. A method of re-calibrating an engine emission control that is installed in an automotive vehicle and that comprises an engine emission control valve, an actuator, and an electric sensor, the valve comprising a body containing an internal main flow passage having an inlet port, an outlet port, and a valve member for selectively restricting flow through the flow passage between the inlet and outlet ports, the actuator having an operative connection for operating the valve member, the electric sensor having a sensing port for sensing a characteristic of the flow and providing an electric signal correlated with the characteristic of the flow, the inlet port being communicated to an exhaust system of an internal combustion engine that powers the vehicle, the outlet port being communicated to vacuum derived from an intake system of the engine so that when the engine operates and the emission control valve is open engine exhaust gas forms fluid flow through the flow passage in a direction from the inlet port to the outlet port, the method comprising:

operating the engine to apply vacuum to the outlet port and to supply exhaust gas to the inlet port;

operating the actuator to allow exhaust gas flow through the flow passage;

sensing a characteristic of the engine exhaust gas; and re-calibrating the sensor to secure a desired relationship between the sensed characteristic of the exhaust gas and the fluid condition sensed by the sensor.

11. A method as set forth in claim 10 in which the step of re-calibrating the sensor comprises electrically programming calibration data into memory of the sensor via an electric terminal of the sensor.

12. A method as set forth in claim 10 in which the step of sensing a characteristic of the exhaust gas comprises sensing a signal from a sensor in the engine exhaust system.

13. A method as set forth in claim 10 in which the step of sensing a signal from a sensor in the engine exhaust system comprises sensing a signal from an oxygen sensor.

14. A method as set forth in claim 12 in which the step of re-calibrating the sensor comprises sensing at least one additional characteristic related to operation of the engine.

15. A method as set forth in claim 14 in which the step of sensing at least one additional characteristic related to operation of the engine comprises sensing at least one of engine intake system vacuum and engine operating temperature.

* * * * *